Feb. 14, 1956 H. L. IVINS 2,734,773
MANUALLY OPERATED RESILIENT AEROSOL SPRAY VALVE
Filed July 28, 1950 2 Sheets-Sheet 1
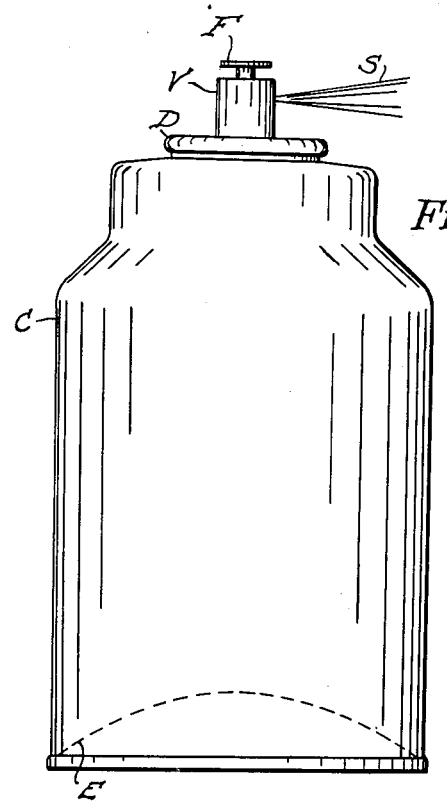
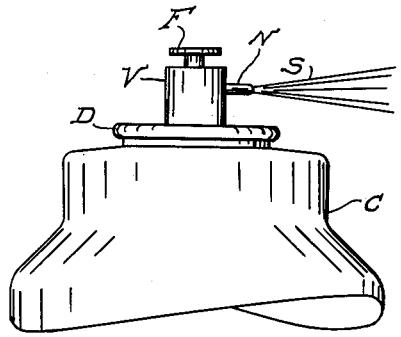
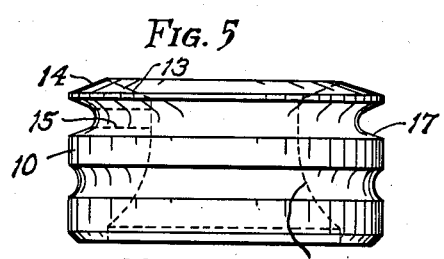
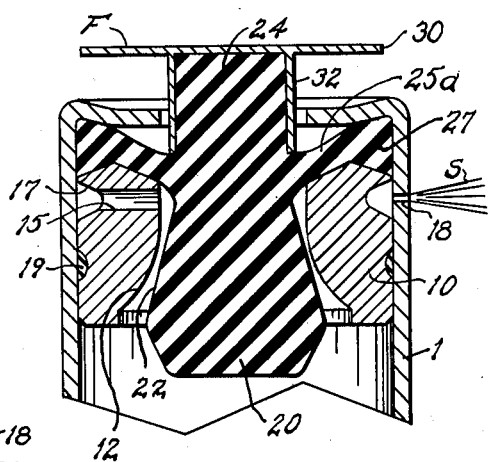
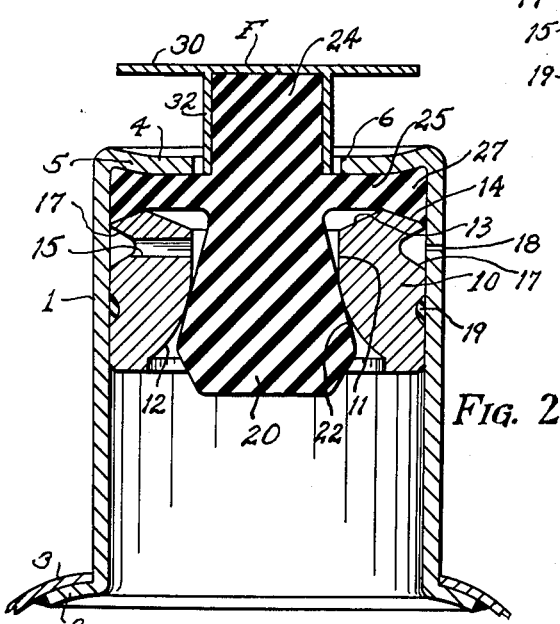
INVENTOR.
HERBERT L. IVINS,
BY
ATTY Feb. 14, 1956  H. L. IVINS  2,734,773
MANUALLY OPERATED RESILIENT AEROSOL SPRAY VALVE
Filed July 28, 1950  2 Sheets-Sheet 2

INVENTOR.
HERBERT L. IVINS,
BY
Justine Macklin
ATT'Y

United States Patent Office

2,734,773
Patented Feb. 14, 1956

2,734,773

MANUALLY OPERATED RESILIENT AEROSOL SPRAY VALVE

Herbert L. Ivins, Cleveland, Ohio, assignor to The Engine Parts Manufacturing Company, Cleveland, Ohio, a corporation of Ohio Application July 28, 1950, Serial No. 176,363

4 Claims. (Cl. 299—95)

This invention relates to a manually operated valve for controlling the release of pressure-fluid from a container through a spray opening or nozzle. In its preferred form, it is particularly designed for use with aerosol spray containers in which liquids, paints, lacquers, insecticides and other fluids are maintained under pressure with a gas liquid, and from which fluid may be released in a fine spray or small stream.

Valves for controlling the release and spraying from pressure fluid containers of the general nature of aerosol cans require very tight sealing when closed, and it is desirable that they may be readily opened and quickly closed after each use.

In many instances it has been found most practical for reasons of simplicity and economy to use a threaded-needle valve which is turned to open and close. Heretofore, various attempts to provide a spring-closed valve, with a manual operating means, have encountered the difficulties of being inordinately expensive, uncertain in operation and insecure or insufficiently tight when closed, with resulting loss of gas pressure.

Resilient-body valves, likewise, have proven unsatisfactory for reasons of insecure sealing, clogging of passages, and expense of manufacture and assembly with the container.

The essential objects of my invention, therefore, are to provide an effectively sealing, simple valve construction which may be cheaply manufactured, and which may be easily opened by pressure of the thumb or finger, to release the fluid contents through the valve and through a discharge passage and spray opening.

The present invention comprises a combination in one integral part of a valve closure or plug and an integral actuating extension both mounted on and movably supported by an integral laterally extending annular wing or diaphragm which in turn affords a seal outside of the valve seat. The passage on the inside of the diaphragm, that is, toward the container communicates with the opening through the valve seat and leads to the exit orifice or spray nozzle.

Specific objects include so constructing a unitary valve plug sealing and operating means that these elements may coact with specially formed but simple parts comprising the valve seat and mounting means therefor.

Other objects include the so designing and shaping of the resilient member that it may engage a specially formed valve seat in such manner as to uniformly completely seal it when closed, and which shall act to effect self-cleaning as the plug or closure element is operated for opening and closing.

Other objects provide for convenient mounting and attachment to the aerosol can or to a bottle, and other specific objects include the provision of a simple effective finger-actuating element attached to the valve operating extension.

In the drawings, Fig. 1 is a side elevation of an aerosol can equipped with my special valve construction;

Fig. 2 is an enlarged central section through the valve and mounting means, and showing the valve in closed position;

Fig. 3 is a similar section showing the valve in open spraying position;

Fig. 4 is an elevation of the valve seat element;

Fig. 5 is a view of the upper portion of the can, showing the valve equipped with a spray nozzle;

Figure 6:
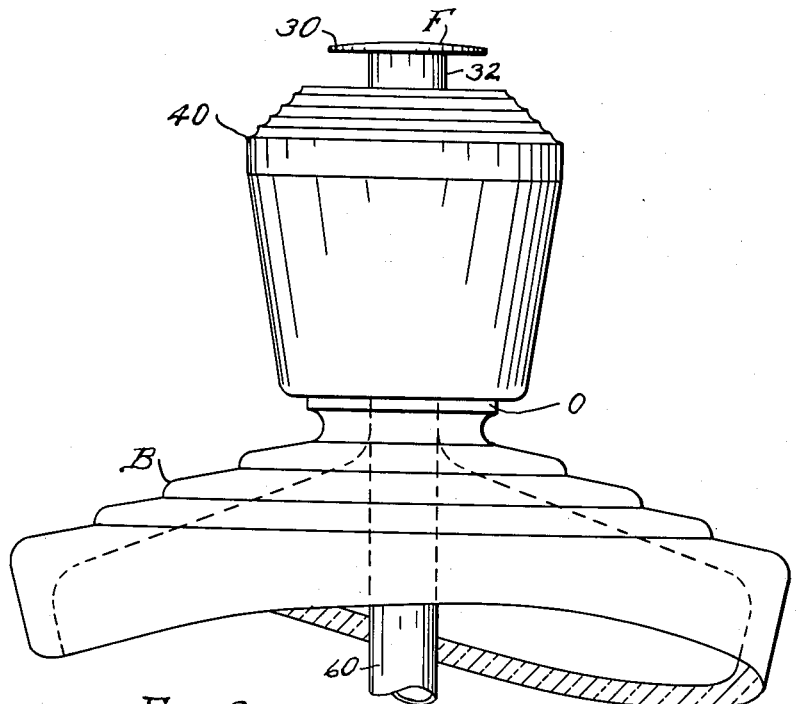
Fig. 6 shows an elevation of the upper portion of a bottle or like container, such as glass or plastic, of the type used for atomizing and like purposes and equipped with a modified form of mounting for my valve structure.

Referring to the drawings, and using like characters for like or similar parts, an aerosol can or container designated C is shown as having an inwardly crowned bottom E and closure cap D, on which is mounted a valve V having a movable member F for actuation by the thumb and finger for opening the valve to deliver a stream or spray, as indicated at S.

In the form shown, the valve body comprises a cylindrical member 1 having a flange 2 securing the member 1 in an opening in the closure top, a portion of which is designated 3 in Fig. 2.

The upper portion of the cylinder is provided with a top wall 4 having an inwardly and downwardly sloping portion 5, the purpose of which will presently appear, and having a central opening 6, through which a portion of the valve member extends, permitting the actuation of the valve.

A valve seat member 10 is fitted tightly into the casing 1 and is provided with a central opening 11 having an inwardly flaring surface 12 forming the valve seat.

A radial passage 15, leading from the bore 11 to an annular groove 17, may lead the fluid from within the container to the discharge orifice 18. A sealing ring 19 may be set into another groove formed in the outer surface of the valve seat member or plug 10.

On the upper end of the annular plug-forming the valve seat, a surface 13 slopes outwardly and upwardly away from the can for a portion of the width of the outer end of the annular valve seat member while a surface 14 slopes downwardly, as shown.

The valve proper is indicated at 20 and is preferably formed with a conical surface 22 adapted to wedge into the curved flaring portion of the valve seat 12. A substantially cylindrical extension 24 integral with the member 20 projects outwardly through the opening 6 in the wall 4. Between the member 24 and the tapered surface of the valve proper 20 is a radial disk-like member 25 having its perimeter provided with flared spreading surfaces fitting between the inwardly turned portion 5 of the top member 4 and the surface 14, where it is thus firmly clamped when the parts are in the position shown.

The member 25 serves as a mounting for the valve proper and its extension 24, and being resilient, and mounted as shown, it normally acts to pull the valve toward the seat, as shown in Fig. 2. Under pressure on the extension 24, this diaphragm 25 flexes and stretches to permit movement of the valve inwardly to the open position shown in Fig. 3, the flared perimeter maintaining its clamping and sealing relation with the contiguous surfaces of the cylinder 1 and the bevel surfaces 5 and 14. Thus, while the pressure of fluid within causes flow of the liquid past the open valve through the passage 15, groove 17 and to the orifice 18, leakage upwardly around the member 24 through the opening 6 is prevented.

The member, comprising the parts 20, 24 and 25, while being resilient is preferably of sufficient solidarity that it maintains its shape, assuring the tight wedging of the tapered surface 22 into the curved flare 12 of the member 10, and its other surfaces at the perimeter effect a complete seal.

The stiffness of the projection 24 is such that the valve may be opened by direct finger pressure thereon. However, I may provide a cap forming the finger contact member F and comprising a disk-like portion 30 with a cylindrical skirt 32 tightly fitting over the member 24, and shown as extending inwardly to the upper surface of the diaphragm portion 25.

Thus, it will be seen that pressure on the top member 30 will deflect the diaphragm to the position shown at 25a where it is stretched radially and pressed against the top of the member 10 and onto the sloping surface 13. This prevents the liquid from accumulating above the annular valve seat member 10, confining the flow to the passage 15 and the groove passage 17 to the spray orifice 18 or nozzle N (Fig. 5).

The resiliency of the valve member not only assures a wedging action in the curving and tapering seat 12, but effects a wiping action preventing accumulation which might otherwise result in leakage when the aerosol container is not being used.

In actual practice, the casing member 1 may be less than half an inch in diameter, and in some instances as small as one-quarter of an inch in diameter. As indicated, a spray nozzle may be used or a mere pinhole opening as at 18 may provide an effective spray opening. In such a case, the opening should be suitably marked in order to indicate the position in which the can is to be held, for directing the spray.

The resilient composite valve member may be molded by known rubber molding methods, and the parts may be cheaply manufactured in large quantities, and in practice the valve effectively seals the pressure in the container when not in use and yet operates with a slight pressure on the member F. The operating pressure required should be such as to normally preclude inadvertent opening. Such parts must be manufactured and assembled at such low cost as to warrant single use followed by throwing away the container and valve. By "single use" is meant the emptying of the contents, of course, whether at one time or on a number of occasions.

Figures 7, 8:
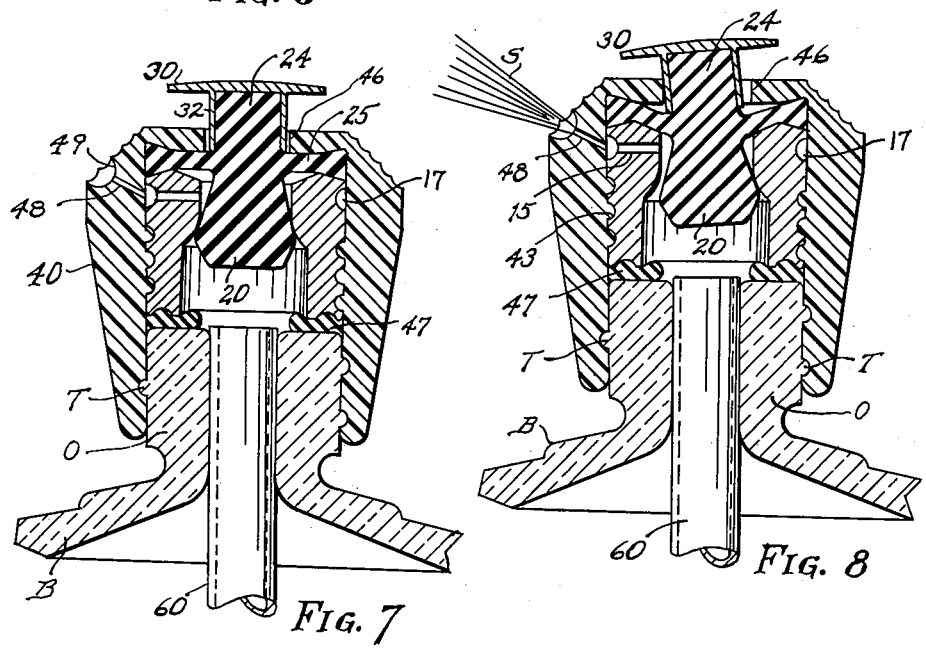
Fig. 7 is a sectional view on a scale somewhat smaller than that of Figs. 2 and 3, showing the valve in closed position and the associated parts.
Fig. 8 is a similar view showing the valve in open position.

The device lends itself to many modified uses, an example of which is shown in Figs. 6, 7 and 8, where an atomizing container of glass or plastic may contain perfumes, colognes, or the like.

Referring to these figures, B indicates a bottle or container having a neck portion O provided with threads T to which may be fitted a cap 40 having suitable threads fitting the threads T, and having threads 43 which may fit threads of the annular valve seat member 10a, otherwise corresponding to the construction of the member 10, above described. The upper end of the cap 40 is shown as provided with an opening 46 through which the upward projection 24 of the valve member 20 extends as before, and the top portion of the cap serves to clamp the flared perimeter of the diaphragm 25, as above described.

The exit orifice communicating with the passage 15 and the groove 17 may lead the liquid to a discharge or spray passage 48, shown as having its outer end terminating in a depression 49.

In Fig. 8 the valve 20 is open, and is shown as depressed and tipped by way of illustrating that it may be opened by any depressing and tipping pressure applied to the member F, here again shown as comprising a disk 30 and a skirt 32 embracing the projection 34 of the valve member. In assembling this arrangement, the valve member 10a is threaded into position clamping the diaphragm. A sealing washer 47 may then be inserted and the cap with the valve therein may then be screwed onto the threads T of the bottle or container, thus the member 47 engaging the top of the bottle neck completes the seal. In this form of container and with the use of liquids which are pigment-free, a feed or syphon tube 60 may extend to the bottom of the container and function in the well-known manner.

Having thus described my invention, what I claim is:

1. An aerosol spray valve device comprising a cylindrical casing having an open end adapted to be attached to a container, and having an end wall at its other end with a substantially central opening therethrough, an annular valve seat member fitted into the casing and having sealing means between it and the inner surface thereof, and having a central bore and an inwardly curved flaring valve seat surface and an annular groove in its periphery, a passage leading from the bore outside of the valve seat to said groove, the casing having a nozzle opening registering with the groove, a tapered resilient plug adapted to fit into and enclose the valve seat surface, a disk-like member having an annular thickened portion at its rim and formed integral with the resilient valve plug, said annular valve member and said end wall having surfaces complementary to said thickened rim for clamping and holding said disk-like member, and means projecting through the opening in said end wall for depressing the disk-like member to open the valve, said disk-like member being of such diameter and thickness and the material thereof and of the plug having such resilience and solidarity that the disk-like member may both stretch and flex to permit the opening of the valve, while the valve plug is sufficiently solid to retain its shape, the diameter of the disk-like member being two or more times greater than that of the diameter of the valve plug.

2. A valve for use with an aerosol can, comprising a cylindrical member adapted to be secured to the top of the can and having an outer wall provided with a central opening therethrough, an annular valve seat member tightly fitted into the casing, and a passage from the inner portion of said member to the outside of the casing, a resilient valve plug having a tapered conical surface adapted to fit into and close the annular valve seat member, a diaphragm member integral with the valve plug and extending radially with relation to the axis of the plug and serving as a support for the plug, the diaphragm wing having an annular thickened portion at its perimeter and the casing and valve seat member having complementary surfaces embracing and clamping the thickened perimeter of the diaphragm wing effecting a sealing action while permitting movement of the central portion of the diaphragm to open the valve consequent upon pressure applied to the diaphragm through said opening in the end wall of the casing, said diaphragm wing being of such diameter and thickness and the material of the diaphragm and the plug having such resilience and solidarity that the diaphragm may both stretch and flex to permit the opening of the valve, while the valve plug is sufficiently solid to retain its shape.

3. The device described in claim 2, in which said annular valve seat member is provided with an inwardly sloping surface against which the central portion of the diaphragm may be pressed when the valve is opened and permitting inward movement of the central portion of the diaphragm.

4. The device described in claim 2 in which the material forming the valve plug and the diaphragm wing is of such resilience that the plug may be forcibly compressed to permit its insertion through the valve seat, following which it may expand to its normal tapered shape and diameter.

References Cited in the file of this patent

UNITED STATES PATENTS

| | | |
|---|---|---|
| 2,204,088 | Kugler | June 11, 1940 |
| 2,348,083 | McCabe | May 2, 1944 |

FOREIGN PATENTS

| | | |
|---|---|---|
| 2,049 | Great Britain | 1860 |